United States Patent [19]

Tokuda

[11] Patent Number: 4,841,340
[45] Date of Patent: Jun. 20, 1989

[54] METHOD OF AN APPARATUS FOR PRODUCING ADDITIONAL PRINT

[75] Inventor: Kanji Tokuda, Kanagawa, Japan

[73] Assignee: Fuji Photo Film Co., Ltd., Kanagawa, Japan

[21] Appl. No.: 140,181

[22] Filed: Dec. 31, 1987

[30] Foreign Application Priority Data

Feb. 9, 1987 [JP] Japan ................................. 62-27815
Feb. 9, 1987 [JP] Japan ................................. 62-27816
Feb. 9, 1987 [JP] Japan ................................. 62-27817

[51] Int. Cl.[4] ........................................... G03B 27/80
[52] U.S. Cl. ...................................... 355/38; 355/68; 355/77
[58] Field of Search .............................. 355/38, 68, 77

[56] References Cited

U.S. PATENT DOCUMENTS 4,526,462 7/1985 Hope et al. .......................... 355/38
4,623,246 11/1986 Kubota et al. ....................... 355/38

Primary Examiner—Richard A. Wintercorn
Attorney, Agent, or Firm—Sughrue, Mion, Zinn, Macpeak & Seas

[57] ABSTRACT

In a method of producing additional prints, detection is made as to data relative to an image on an original-image film and data relative to an image printed on a printed sheet of photographic paper from the original-image film. On the basis of the above-mentioned data, arithmetic operations are performed upon the amount of exposure required for printing the image on the photographic paper from the orignal-image film. On the basis of the results of the arithmetic operations, exposure control relative to the printing is performed to finish the color characteristics of an image to be reprinted on the photographic paper so that the color characterisitcs may be made substantially the same as the color characteristics of the image printed on the printed sheet.

A printing apparatus for producing additional prints has a sensor for detecting image data relative to an original-image film; and a sensor for detecting image data relative to an image printed on a printed sheet of photographic paper from the original-image film. The printing apparatus is arranged to perform arithmetic operations upon the amount of exposure required for printing the image on the photographic paper from the original-image film, on the basis of the data detected by these sensors, thereby performing exposure control relative to the printing to finish the color characteristics of the image to be reprinted on the photographic paper so that the color characteristics may be made substantially the same as the color characteristics of the image printed on the printed sheet.

20 Claims, 6 Drawing Sheets

METHOD OF AN APPARATUS FOR PRODUCING ADDITIONAL PRINT

BACKGROUND OF THE INVENTION

1. Field of the Invention

The present invention relates to a method of and an apparatus for producing an additional print by exposing photographic paper on the basis of image data relative to a printed sheet of photographic paper.

2. Description of the Related Art

In a typical photograph printing apparatus, light emitted from a light source and transmitted through an original-image film is projected onto photographic paper by a lens unit and thus the photographic paper is exposed to an image on the film. Printing apparatus of the type that is applied to the printing of color photographs are arranged such that light rays emitted from a light source illuminate an original-image film via a light control filter device constituted by color compensating filters for yellow (Y), magenta (M) and cyan (C).

In such a printing apparatus, image-density sensors constituted by photosensitive elements such as photodiodes are interposed between the original-image film and the lens unit for detecting image density data relative to the film.

The image density data is supplied to an exposure controller, in which arithmetic operations upon the amount of exposure relative to each color are performed by the following equation so as to enable each photograph to be printed at an optimum exposure value corresponding to the density of each image formed on the original-image film. This is based on a known Evans' theorem.

$$\log E_i = \log E_{Ni} + C_j(D_{Nj} - D_{NNj}) \quad (1)$$

where
- $E$: amount of exposure relative to the original-image film;
- $E_N$: amount of exposure relative to a normal original-image film;
- $C$: correction factor relative to the density of the original-image film;
- $D_N$: LATD of the original-image film;
- $D_{NN}$: LATD of the normal original-image film;
- i: one of red, green and blue; and
- j: one of Y, M and C.

However, in actual printing, the amount of exposure calculated from the above equation (1) may be further corrected on the basis of a correction value relative to a specific image pattern. This correction is commonly performed by a skilled operator in order to prevent color and density from being imperfectly reproduced owing to a color-philia or density-philia.

In a case where a customer requests that a negative film be developed and at the same time an image be printed from each frame of the film on a sheet of photographic paper of the same size, the aforesaid printing apparatus can be used to produce initial prints without any difficulties. Thereafter, the customer may request that additional prints be produced from the same film. In this case, however, if reprinting is performed on the basis of the LATD of the original-image film of the customer, various problems are encountered. For example, even if the same printing and developing apparatus used for the initial printing are employed for the additional printing, variations occur in the operating state of the light source or the state of a developer. Therefore, the finish of additional prints is likely to differ from that of the initial prints and this constitutes one cause of complaints from consumers. In a particular case where a photograph is printed from a film having an image with an imperfect color balance, the operator makes more or less subjective corrections on the basis of his visual checking as described previously. Therefore, the same corrections as those of the initial prints are not necessarily performed for the additional printing, and this constitutes another cause of complaints from consumers.

SUMMARY OF THE INVENTION

It is therefore an object of the present invention to provide a method of and an apparatus for producing an additional print both of which are capable of producing an addition print of the same finish as that of a previously printed sheet of photographic paper on the basis of image data relative to an original-image film and image data relative to the printed sheet.

To this end, one aspect of the present invention resides in a method of producing an additional print, comprising the steps of (a) performing arithmetic operations upon the amount of exposure required for printing an image on photographic paper from an original-image film on the basis of a set of data (a first set of data) relative to the image on the original-image film and another set of data (a second set of data) relative to the image printed on a printed sheet of photographic paper from the original-image film; and (b) performing exposure control on the basis of the results of the arithmetic operations to finish the color characteristics of the image to be reprinted on the photographic paper so that the color characteristics become substantially the same as the color characteristics of the image printed on said printed sheet.

In accordance the above aspect of the present invention, arithmetic operations are performed upon the amount of exposure on the basis of the set of data (the first set of data) relative to the image on the original-image film and the data (the second set of data) relative to the image on the printed sheet of photographic paper. Accordingly, the finish of the photographic paper as an additional print can be made the same as that of the original image on the printed sheet.

In particular, the previously-mentioned initial prints are finished with an optimum quality since, as described previously, a skilled operator makes proper corrections so that the color characteristics such as color density, saturation, tone and hue of the initial prints pass delivery inspections.

Accordingly, if the color characteristics of the initial prints, for example, the density is measured and the measurement result is used as a reference for additional printing, the quality of finish equivalent to that realized by the skilled operator can be achieved without the need for time-consuming work as compared with the processing of the initial prints.

Another aspect of the present invention resides in an printing apparatus for producing an additional print, comprising a first data detecting means for detecting a set of data (a first set of data) relative to an image on an original-image film; a second data detecting means for detecting a set of data (a second set of data) relative to an image printed on a printed sheet of photographic paper from the original-image film; arithmetic means for, on the basis of the first and second sets of data, performing arithmetic operations upon the amount of exposure required for printing the image on photographic paper from the original-image film; and exposure control means for performing exposure control on the basis of the results of the arithmetic operations to finish the color characteristics of the image to be reprinted on the photographic paper so that the color characteristics may be made substantially the same as the color characteristics of the image printed on the printed sheet.

In accordance with the above aspect of the present invention, the amount of exposure is determined employing the set of detected data (the first set of data) relative to the image printed on the printed sheet of photographic paper and the other set of data (the second set of data) relative to the image on the original-image film, the second data conventionally applied to the corrections of the amount of exposure. Accordingly, it is possible to achieve the same finish as that of the original image printed on the printed sheet.

It is common practice to obtain the above-mentioned kinds of data, for example, from the density of each image, i.e., the integrated density of the whole of each image. However, an important portion suitable for detection of the density may be selectively measured. Therefore, detecting devices may be constituted by area sensors such as CCDs which are previously incorporated for film photometry in some of conventional printing apparatus. The density of an image printed on the photographic paper may be detected by measuring light emitted from the light source and reflected from the photographic paper. The printed sheet of photographic paper for use in measuring the density of such reflected light need not necessarily be one which corresponds to a frame of the original-image film to be printed. For example, it is possible to select one from different frames having substantially similar image patterns.

DESCRIPTION OF THE PREFERRED EMBODIMENT

A preferred embodiment of the present invention will be described with reference to the accompanying drawings.

Figure 1:
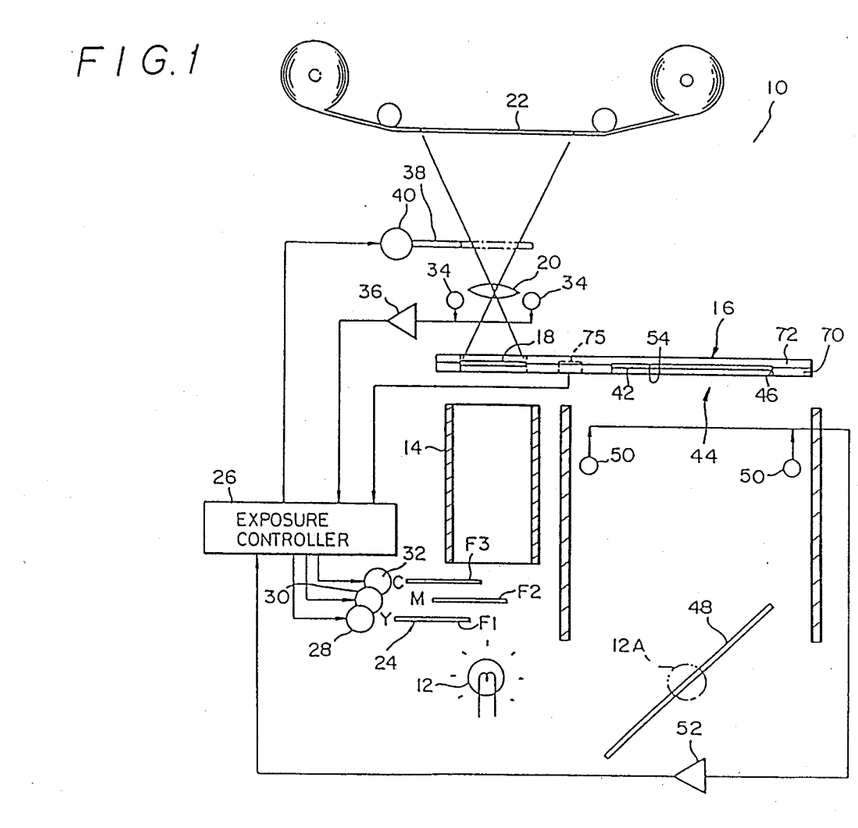
FIG. 1 diagrammatically illustrates the construction of a photograph printing apparatus constituting a preferred embodiment of the present invention.

FIG. 1 diagrammatically illustrates one example of a photograph printing apparatus indicated generally at 10. As illustrated, light emitted from a light source 12 passes through a light diffusion cylinder 14 and illuminates a negative film 18 as an original-image film carried by a carrier 16. The original image is printed from the negative film 18 through a lens unit 20 onto photographic paper 22.

A light control filter device 24 constituted by a combination of yellow (Y), magenta (M) and cyan (C) color compensating filters F1, F2 and F3 is interposed between the light source 12 and the light diffusion cylinder 14. The color compensating filters F1, F2 and F3 of the light control filter device 24 are respectively controlled by drivers 28, 30 and 32 responsive to signals supplied from an exposure controller 26. The Y, M and C filters F1, F2 and F3 serve to subtract a color component or components which is not regarded as being required during exposure to white light.

A pair of density sensors 34 for detecting image density data relative to three primary colors of red (R), green (G) and blue (B) are disposed between the negative film 18 and the lens unit 20. The density sensors 34 are each constituted by an assembly of photosensitive elements such as photodiodes. The density sensors 34 are adapted to receive light emitted from the light source 12 and transmitted through the negative film 18 and supply a density distribution data signal relative to the negative film 18 to the exposure controller 26 through an amplifier 36.

The exposure controller 26 determines a correction factor on the basis of a known Evans' theorem so as to adjust the balance of the three color components Y, M and C so that the color obtained from these components turns gray, and thus controls the amount of exposure $E_i$ in accordance with the previous equation (1).

After the energization of a solenoid 40 constituting one part of a shutter 38 (after the start of exposure), each time one of the color components reaches a required amount of exposure, a corresponding one of the color compensating filters F1, F2 and F3 of the light control filter device 24 is inserted into the optical path to terminate the exposure of the color component. Thus the total exposure period is controlled.

A photographic-paper holding portion 44 for holding a printed sheet of photographic paper 42 is formed in the carrier 16 which carries the negative film 18. A sheet of the photographic paper 42 which bears an image printed from the negative film 18 is disposed in the photographic-paper holding portion 44.

An aperture 46 is formed on the side of the carrier 16 on which the printed surface of the photographic paper 42 loaded into the photographic-paper holding portion 44 is exposed. The aperture 46 opposes the light source 12 via an optical system such as a mirror 48 and thus light rays which illuminate the negative film 18 and those which illuminate the photographic paper 42 are caused to vary in substantially the same manner as each other. The size of photographic paper is divided into size E and size L, and the type of the same is divided into the type that has white margins and the type that has no white margins. It is therefore preferable to make the area of the aperture 46 equal to or smaller than that occupied by the image surface of E-size paper surrounded by the white margins and to black at least the edges of the aperture in order to prevent the light rays from being reflected at the aperture.

It is to be noted that the kind of optical system interposed between the light source 12 and the photographic paper 42 is not limited solely to the mirror 48. Other kinds of optical system such as lens units may be employed depending upon the position at which the light source 12 is disposed. In addition, such an optical system need not necessarily be used in a case where light emitted from the light source 12 is capable of directly illuminating both the negative film 18 and the photographic paper 42.

A pair of density sensors 50 having the same structures as those of the density sensors 34 are interposed between the mirror 48 and the photographic-paper holding portion 44 in the carrier 16. The density sensors 50 detect the density of the printed surface of the photographic paper 42 when the printed surface reflects illuminating light emitted from the light source 12 (in the present embodiment the light of a light source 12A, shown by a phantom line in FIG. 1, which is reflected by the mirror 48). It is preferable that this density be the average value of the density of the entire image.

The density data signal detected by the density sensors 50 is supplied through an amplifier 52 to the exposure controller 26. The photographic-paper holding portion 44 has a gray bottom surface 54. Accordingly, in a case where the photographic paper 42 is not disposed in the photographic-paper holding portion 44 during printing from the negative film 18, a density data signal which correspondes to the state which requires no color correction in accordance with Evans' theorem is supplied to the exposure controller 26.

Figure 2:
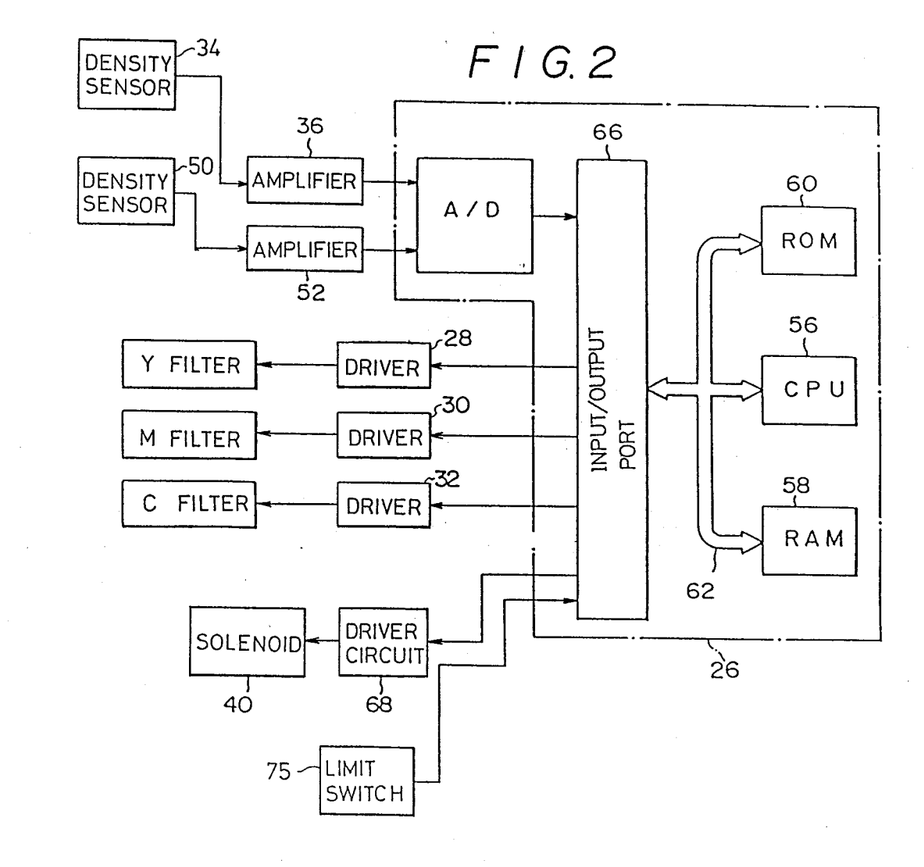
FIG. 2 is a block diagram of the control circuit of the preferred embodiment.

As shown in FIG. 2, the exposure controller 26 includes a CPU (central processing unit) 56, a RAM (random access memory) 58, a ROM (read-only memory) 60 and a bus 62 for connecting them, such as a data bus and a control bus.

The output signals of amplifiers 36 and 52 are respectively supplied to an input/output port 66 via an A/D (analog/digital) converter 64. On the basis of these signals, further signals are supplied from the input/output port 66 to the solenoid 40 and the drivers 28, 30 and 32.

The ROM 60 stores therein the following equation based on the previously-described equation (1).

$$\log E_i = \log E_{Ni} + C_j(D_{Nj} - D_{NNj}) + \gamma_j(D_{Pj} - D_{NPj}) \quad (2)$$

where $\gamma$: correction factor relative to the density of the photographic paper;

$D_P$: density of the photographic paper;

$D_{NP}$: density of a normal photographic paper;

On the basis of the equation (2), the CPU 56 performs arithmetic operations upon the amount of exposure $E_i$ relative to each color (i: red, green or blue) and furthermore the exposure period of each color, as well as the operating period of each of the color compensating filters F1, F2 and F3 of the light control filter device 24.

The carrier 16 will now be described in detail with reference to FIG. 3.

As illustrated, the carrier 16 is constituted by a base 70 and a cover 72, and one longitudinal edge of the base 70 is joined to that of the cover 72 by means of hinges 74 so that their respective primary surfaces may be moved into and out of contact with each other. A limit switch 75 is mounted on the base 70 for detecting the opening and closing of the cover 72. A signal line of the limit switch 75 is connected to the exposure controller 26.

Figure 3:
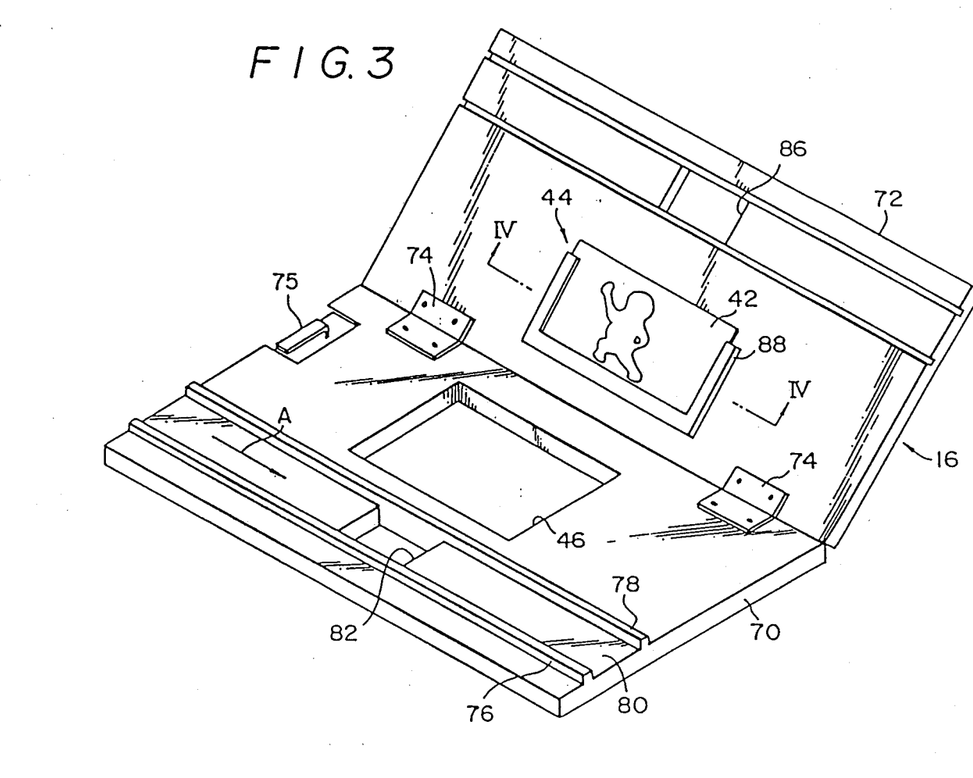
FIG. 3 is a perspective view of a carrier for use with the preferred embodiment.

Two ridges 76 and 78 which extend parallel to the longitudinal edge of the base 70 are integrally formed on a portion of the base 70 which is near this side as viewed in FIG. 3. The space between the ridges 76 and 78 serves as a guide passage 80 for guiding the breadthwise edges of the negative film 18. This construction enables the negative film 18 to be positively moved straight in the longitudinal direction (in the direction of an arrow A in FIG. 3).

The lengthwise mid portion of the guide passage 80 has a through-hole 82 having a rectangular form corresponding to one frame of the negative film 18. The negative film 18 is illuminated through the through-hole 82 by light emitted from the light source 12.

A through-hole 86 is formed in the cover 72 at a position thereof corresponding to the through-hole 82, and the light rays transmitted through the negative film 18 are conducted through the through-hole 86 toward the lens unit 20.

Figure 4:
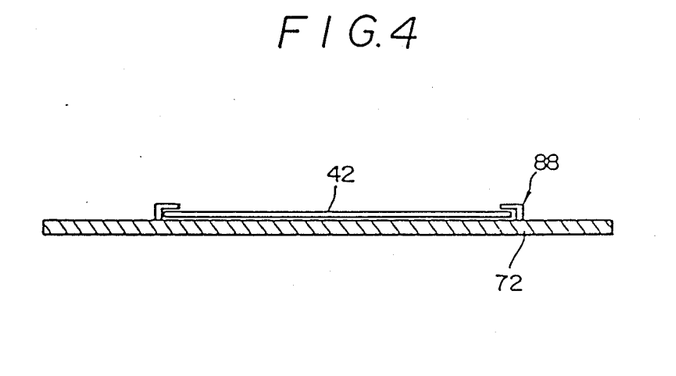
FIG. 4 is a cross section taken along the line IV—IV of FIG. 3.

A frame member 88 having a substantially C-like form is attached to the cover 72 at a position thereof below the through-hole 86 as viewed in FIG. 3. As shown in FIG. 4, the frame member 88 has a substantially L-like cross-section which enables the photographic paper 42 to be held in an inserted manner. The aforesaid aperture 46 is formed in the base 70 at a position thereof corresponding to the portion surrounded by the frame member 88. As shown in FIG. 1, when the cover 72 is closed, the printed surface of the photographic paper 42 is adapted to oppose the mirror 48.

Specifically, when a predetermined frame of the negative film 18 is located at the position corresponding to the through-holes 82 and 86 and a sheet of the photographic paper 42 which is previously printed from that frame and yet which requires correction is inserted into the frame member 88, it is possible to acquire density data relative to this photographic paper 42 during printing from the negative film 18.

Figure 5:
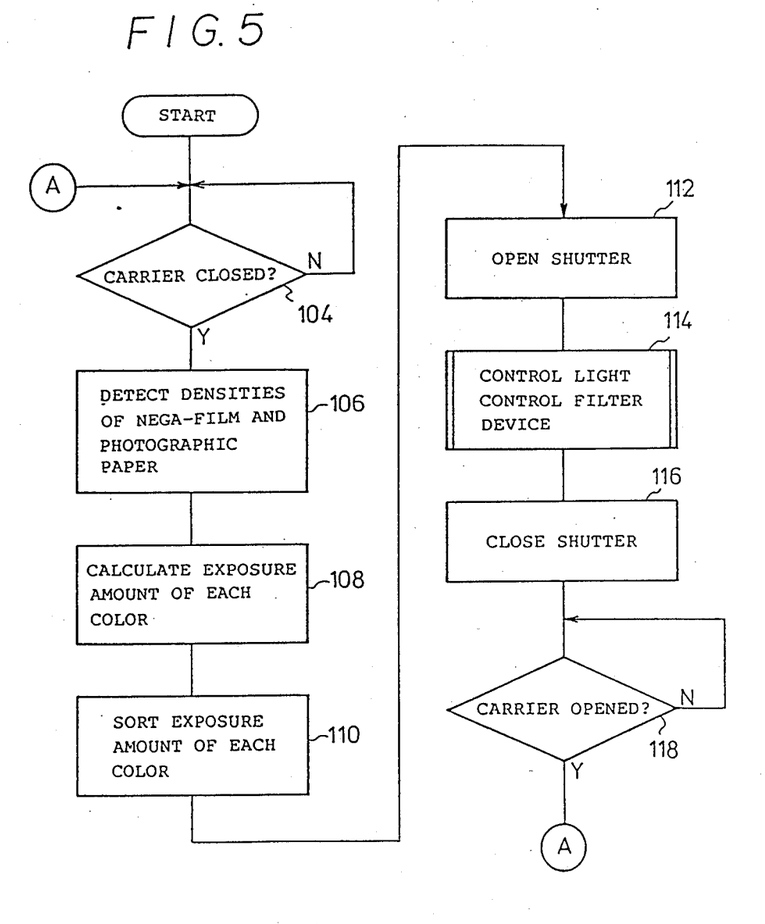
FIG. 5 is a flow chart illustrating the control operations of the preferred embodiment.

The procedures for effecting printing in a photograph printing apparatus having the above-described arrangement will be described with reference to the flow chart of FIG. 5. It is assumed that the light source 12 is previously energized to emit light rays.

First, the negative film 18 is loaded into the carrier 16 and is moved in either the direction of the arrow A of FIG. 3 or the direction opposite thereto to cause a desired frame to correspond to the through-hole 82. During this movement, the breadthwise edges of the negative film 18 are guided by the ridges 76 and 78 of the carrier 16 to enable the negative film 18 to move linearly without any zigzag motion.

After an operator has located the negative film 18 at a predetermined position, the operator inserts a printed sheet of the photographic paper 42 corresponding to the frame of the negative film 18 into the frame member 88 and thus locates the printed sheet in the photographic-paper holding portion 44. In this manner, the carrier 16 is capable of carrying one pair consisting of a predetermined frame of the negative film 18 and the sheet of the photographic paper 42 which has been previously printed from that frame but which requires correction because of the imperfect quality of its printing. This facilitates operations such as checking.

After completion of the above-described preparation step, in Step 104, the cover member 72 of the carrier 16 is rotated about the pivot axis of the hinges 74 and is thus superimposed on the base 70. When the limit switch 75 detects this closed state, the process proceeds to Step 106. In Step 106, correction values relative to the color characteristics of the printed sheet of the photographic paper 42, such as density, tone, hue and saturation, are input through the keyboard 90. Thus desired correction data is stored in the exposure controller 26. In Step 106, the density sensors 34 detect the density of the frame of the negative film 18 on the basis of the light which is transmitted through the negative film 18 after emitted from the light source 12. Simultaneously, light rays emitted from the light source 12 are reflected from the mirror 48 to illuminate the photographic paper 42. The light rays are reflected from the photographic paper 42 and thus the density of the image printed on the photographic paper 42 is detected by the density sensors 50.

In an instance where the densities of the negative film and the photographic paper are detected employing separate light sources, the detection result may be influenced by variations in the intensity of each lamp used as the light sources. In this embodiment, however, the densities of the negative film 18 and the photographic paper 42 are detected employing the same light source. It is therefore possible to eliminate such an influence and to reduce the level of electrical power required for energization of the light source.

In this embodiment, the densities of the negative film 18 and the photographic paper 42 which are detected by the density sensors 34 and 50 are illustratively obtained from the average values of the densities relative to the entire images of them. However, each of the densities may be obtained by measuring one important portion of each of the negative film 18 and the photographic paper 42. Also, in an instance where the photographic-paper 42 is not disposed in the photographic-paper holding portion 44, the density detected by the density sensors 50 is substantially equal to that of the normal photographic paper since the bottom surface 54 of the photographic-paper holding portion 44 is gray.

In Step 108, arithmetic operations are performed upon the amount of exposure relative to each color by using the equation (2) on the basis of the respective densities detected in Step 106. Also, in a case where the photographic paper 42 is not disposed as described previously, the respective amounts of exposure are calculated using the previously-mentioned equation (1).

Each of the exposure amounts calculated in Step 108 is converted into a corresponding exposure period. In Step 110, the exposure periods are sorted in ascending order. Then, in Step 112, the shutter 38 is opened (the solenoid 40 is energized). Thus the light transmitted through the predetermined frame of the negative film 18 is projected through the lens unit 20 onto the photographic paper 22 and the exposure thereof is started.

In Step 114, each of the light compensating filters F1, F2 and F3 of the light control filter device 24 is operated for a predetermined period so that, each time the exposure of one color is completed, the color is cut off. When the exposure of all colors is completed, the process proceeds to Step 116, in which the shutter 38 is closed. This operation will be described later.

In Step 118, when the limit switch 75 detects the fact that the operator opens the carrier 16, printing is completed. Subsequently, when another original-image film or another frame of this film and another sheet of the photographic paper 42 are loaded into the carrier 16 and the carrier 16 is closed, printing is restarted.

Figure 6:
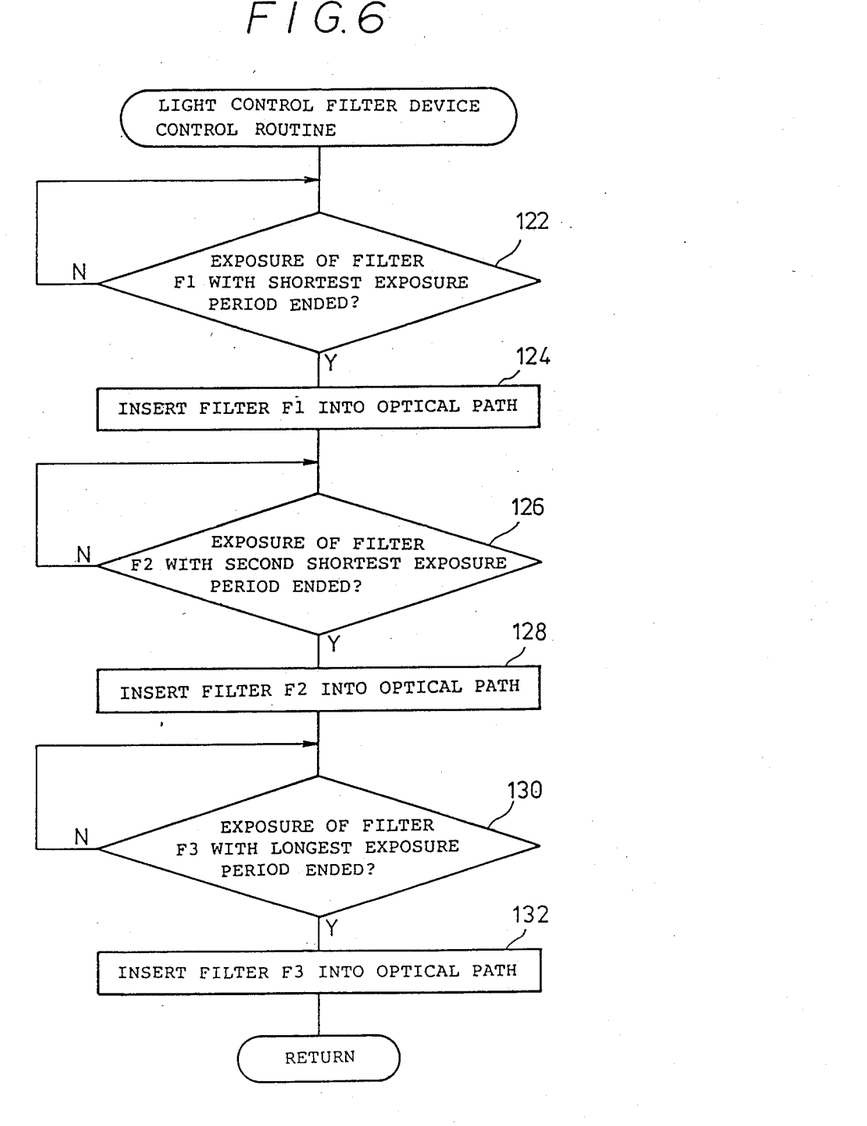
FIG. 6 is a flow chart illustrating an exposure control subroutine in the main routine shown in FIG. 5.

The subroutine of the Step 114 will now be described in detail with reference to FIG. 6.

In Step, the color compensating filters of the light control filter device 24 are rearranged in an ascending order, for example, in the order, the yellow filter F1, the magenta filter F2 and the cyan filter F3. Judgement is made in Step 122 as to whether or not the period allocated for the exposure of yellow has passed. If it is judged that the period has passed, a signal is fed from the exposure controller 26 to the driver 28 in Step 124 and the filter F1 is inserted into the optical path. Then, if it is judged in Step 126 that the period allocated for the exposure of magenta has passed, the driver 30 is operated in Step 128 and the filter F2 is inserted into the optical path. Similarly, if it is judged in Step 130 that the cyan exposure period which is the longest exposure period of the three has passed, the driver 32 is operated in Step 123 to insert the filter F3 into the optical path. Subsequently, the process returns to the main routine.

In this manner, the color compensating filters of the light control filter device 24 are controlled in accordance with the density of the printed sheet of the photographic paper 42 as well as the density of the negative film 18. Accordingly, the finish of additionally printed images on the photographic paper can be made substantially the same as that of the original image on the photographic paper 42 (for example, images on the photographic paper which are initially printed at the time of film development.)

Since the light source 12 is used as a common light source for the negative film 18 and the photographic paper 42, there is no variation in chromaticity and, in addition, cost can be reduced as compared with the case where a separate light source is disposed for each of them.

The negative film 18 and a corresponding printed sheet of the photographic paper 42 can be easily compared with each other during reprinting since the carrier 16 is capable of carrying a pair of the negative film 18 and the photographic paper 42.

The presently preferred embodiment is arranged to sequentially detect the density of the photographic paper 42 by way of example. However, density data relative to the photographic paper 42 may be measured by a separate measuring device and the density data is recorded on a recording medium such as magnetic tape, and required density data may be input to the exposure controller 26 on the basis of the recording. Also, although the light source 12 is used in common to illuminate the negative film 18 and the photographic paper 42, light sources can of course be separately provided for the original-image film 18 and the photographic paper 42 to thereby realize the same finish as that of the image printed on the photographic paper 42.

As described above, the method of and the apparatus for producing an additional print in accordance with the present invention provides the excellent effect of realizing the same finish as that of an image previously printed on a sheet of photographic paper on the basis of image data relative to an original-image film having the image and image data relative to another sheet of photographic paper on which the same image is properly printed.

What is claimed is:

1. A method of producing an additional print from a negative film by a printer whose internal conditions are preset, wherein said additional print has the same color characteristics of an image on a first printed sheet, said method comprising the steps of:
   (a) performing arithmetic operations upon the amount of exposure required for printing an image on photographic paper from said negative film of an original image on the basis of a first set of data of said original image on said negative film and a second set of data of said image on said first printed sheet of photographic paper printed from said negative film; and (b) performing exposure control on the basis of the results of said arithmetic operations to finish the color characteristics of said image to be additionally printed on said photographic paper so that said color characteristics become substantially same as the color characteristics of said image printed on said first printed sheet, wherein said step (a) includes the steps of (c) detecting said first set of data and (d) detecting said second set of data.

2. A method of producing an additional print according to claim 1, wherein in a case where steps (c) and (d) are performed, both said negative film and said image on said first printed sheet are simultaneously illuminated under the same conditions.

3. A method of producing an additional print according to claim 2, wherein said first set of data includes density data relative to said negative film and said second set of data includes data relative to said image formed on said first printed sheet.

4. A method of producing an additional print according to claim 3, wherein said exposure control is performed by moving each filter of a light control filter device into and out of an optical path extending between said image on said negative film and a light source for illuminating said image and at the same time opening and closing a shutter.

5. A method of producing an additional print according to claim 4, wherein said step (c) is performed by detecting light emitted from said light source and transmitted through said negative film and said step (d) is performed by detecting light emitted from said light source and reflected from said first printed sheet of photographic paper.

6. A printing apparatus for producing an additional print from a negative film by a printer whose internal conditions are preset, wherein said additional print has the same color characteristics of an image on a first printed sheet, comprising:

means for detecting a first set of data of an image on said negative film;

means for detecting a second set of data of said image on said first printed sheet on said photographic paper from said negative film;

means for performing arithmetic operations upon the amount of exposure required to print said image for said additional print on a photographic paper from said negative film on the basis of said first and second sets of data; and means for controlling exposure on the basis of the results of said arithmetic operations to finish the color characteristics of said image to be printed on said photographic paper so that said color characteristics may be made substantially the same as the color characteristics of said image printed on said first printed sheet.

7. A printing apparatus for producing an additional print according to claim 6, further comprising a light source for illuminating said negative film and said first printed sheet of photographic paper in order to obtain said first and second set of data.

8. A printing apparatus for producing an additional print comprising:

a first data detecting means for detecting a set of data (a first set of data) relative to an image on an original-image film;

a second data detecting means for detecting a set of data (a second set of data) relative to an image printed on a printed sheet of photographic paper from said original-image film;

arithmetic means for, on the basis of said first and second data, performing arithmetic operations upon the amount of exposure required for printing said image on photographic paper from said original-image film;

exposure control means for performing exposure control on the basis of the results of said arithmetic operations to finish the color characteristics of said image to be printed on said photographic paper so that said color characteristics may be made substantially the same as the color characteristics of said image printed on said printed sheet, a light source for illuminating said original-image film and said printed sheet of photographic paper in order to obtain said first and second set of data; and a carrier having a through-hole equivalent in size to one image frame of said original-image film and arranged to carry said original-image film to enable said one image frame to be located at a position corresponding to said through-hole.

9. A printing apparatus for producing an additional print according to claim 8, wherein said carrier has a photographic-paper holding portion in which said printed sheet is located.

10. A printing apparatus for producing an additional print according to claim 9, wherein said photographic-paper holding portion has an photographic-paper exposing aperture formed adjacent to said through-hole for allowing a printed surface of said printed sheet to be exposed to said light source.

11. A printing apparatus for producing an additional print according to claim 7, wherein said exposure control means is arranged to perform said exposure control by causing each filter of a light control filter device to move into and out of an exposure optical path extending between said light source and said photographic paper and at the same time opening and closing said exposure optical path by means of a shutter.

12. A printing apparatus for producing an additional print according to claim 11, wherein said first data detecting means includes density sensor means for detecting density data relative to said image on said original-image film on the basis of light transmitted through said original-image film.

13. A printing apparatus for producing an additional print according to claim 12, wherein said second data detecting means includes density sensor means for detecting density data relative to said image formed on said printed sheet of photographic paper on the basis of light reflected from said printed sheet.

14. A printing apparatus for producing an additional print comprising:

a first data detecting means for detecting a set of data (a first set of data) relative to an image on an original-image film;

a second data detecting means for detecting a set of data (a second set of data) relative to an image printed on a printed sheet of photographic paper from said original-image film;

arithmetic means for, on the basis of said first and second data, performing arithmetic operations upon the amount of exposure required for printing said image on photographic paper from said original-image film;

exposure control means for performing exposure control on the basis of the results of said arithmetic operations to finish the color characteristics of said image to be printed on said photographic paper so that said color characteristics may be made substantially the same as the color characteristics of said image printed on said printed sheet, a light source for illuminating said original-image film and said printed sheet of photographic paper in order to obtain said first and second set of data;

said exposure control means is arranged to perform said exposure control by causing each filter of a light control filter device to move into and out of an exposure optical path extending between said light source and said photographic paper and simultaneously opening and closing said exposure optical path by means of a shutter, said first data detecting means includes density sensor means for detecting density data relative to said image on said original-image film on the basis of light transmitted through said original-image film, said second data detecting means includes density sensor means for detecting density data relative to said image formed on said printed sheet of photographic paper on the basis of light reflected from said printed sheet, and a mirror for reflecting light emitted from said light source to cause it to illuminate said printed sheet of photographic paper.

15. A printing apparatus for producing an additional print from a negative film by a printer whose internal conditions are preset, wherein said additional print has the same color characteristics of an image on a first printed sheet, comprising:

a carrier for carrying a negative film;

a light source for projecting an image from said negative film carried by said carrier, onto a photographic paper;

film image density detecting means for detecting a first density of an image on said negative film;

paper-image density detecting means for detecting a second density of an image on said first printed sheet printed sheet printed from said negative film;

arithmetic means for performing arithmetic operations upon the amount of exposure required to print said image for said additional print on a photographic paper from said negative film on the basis of said first and second densities; and exposure control means for performing exposure control on the basis of the results of said arithmetic operations to finish the density of said image to be additionally printed on said photographic paper so that said color characteristics may be made the same as that of said image printed on said first printed sheet.

16. A printing apparatus for producing an additional print comprising:

a carrier for carrying an original-image film;

a light source for projecting an image from said original-image film carried by said carrier, onto photographic paper;

film image density detecting means for detecting the density (a first density) of an image on an original-image film;

paper-image density detecting means for detecting the density (a second density) of an image printed on a printed sheet from said original-image film;

arithmetic means for, on the basis of said first and second densities, performing arithmetic operations upon the amount of exposure required for printing said image on said photographic paper from said original-image film; and exposure control means for performing exposure control on the basis of the results of said arithmetic operations to finish the density of said image to be reprinted on said photographic paper so that said color characteristics may be made the same as that of said image printed on said printed sheet, wherein said carrier has a photographic-paper holding portion in which said printed sheet of photographic paper is located.

17. A printing apparatus for producing an additional print according to claim 16, wherein said carrier has a through-hole equivalent in size to one image frame of said original-image film and a photographic-paper exposing aperture formed adjacent to said through-hole for allowing a printed surface of said printed sheet to be exposed to said light source.

18. A printing apparatus for producing an additional print according to claim 17, wherein said film-image density detecting means includes density sensor means for detecting the density of said image on said original-image film on the basis of light transmitted through said original-image film and said paper-image density detecting means includes density sensor means for the density of said image printed on said printed sheet of photographic paper on the basis of light reflected from said printed surface.

19. A printing apparatus for producing a reprint according to claim 18, wherein said photographic-paper exposing aperture is provided with a gray bottom surface.

20. A method of producing an additional print from a negative film by a printer whose internal conditions are preset, wherein said additional print has the same color characteristics of an image on a first printed sheet, said method comprising the steps of:

(a) performing arithmetic operations upon the amount of exposure required for printing an image on photographic paper from said negative film of an original image on the basis of a first set of data of said original image on said negative film and a second set of data of said image on said first printed sheet of photographic paper printed from said negative film; and (b) performing exposure control on the basis of the results of said arithmetic operations to finish the color characteristics of said image to be additionally printed on said photographic paper so that said color characteristics become substantially the same as the color characteristics of said image printed on said first printed sheet, wherein said step (a) includes the steps of (c) detecting said first set of data and (d) detecting second set of data, and in a case where said steps (c) and (d) are performed, both said image on said negative film and said image on said first printed sheet are illuminated under the same conditions.

* * * * *